(12) United States Patent  
Akhtar et al.

(10) Patent No.: US 10,209,087 B2  
(45) Date of Patent: Feb. 19, 2019

(54) NAVIGATION SYSTEM AND METHOD

(71) Applicant: Jaguar Land Rover Limited, Coventry (GB)

(72) Inventors: Naseem Akhtar, Coventry (GB); Brian Gerrard, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 172 days.

(21) Appl. No.: 15/128,738

(22) PCT Filed: Mar. 25, 2015

(86) PCT No.: PCT/EP2015/056353  
§ 371 (c)(1),  
(2) Date: Sep. 23, 2016

(87) PCT Pub. No.: WO2015/144746  
PCT Pub. Date: Oct. 1, 2015

(65) Prior Publication Data  
US 2018/0106632 A1    Apr. 19, 2018

(30) Foreign Application Priority Data  
Mar. 25, 2014  (GB) .................... 1405302.9

(51) Int. Cl.  
*G01C 21/34* (2006.01)  
*G01C 21/36* (2006.01)

(52) U.S. Cl.  
CPC ..... *G01C 21/3492* (2013.01); *G01C 21/3461* (2013.01); *G01C 21/3697* (2013.01)

(58) Field of Classification Search  
CPC ............ G01C 21/3461; G01C 21/3697; G01C 21/3492; G08G 1/096844; G08G 1/096827; G08G 1/096811; G08G 1/096775  
(Continued)

(56) References Cited

U.S. PATENT DOCUMENTS 8,775,069 B1   7/2014  Kabel et al.  
2002/0194016 A1* 12/2002  Moribe .............. G01C 21/3697  
701/469  
(Continued)

FOREIGN PATENT DOCUMENTS

DE   19941966   3/2001  
DE   10253505   5/2004  
(Continued)

OTHER PUBLICATIONS

Examination report No. 1 for standard patent application, Australian Patent Application No. 2015238429, dated Apr. 3, 2017.  
(Continued)

*Primary Examiner* — Maceeh Anwari  
(74) *Attorney, Agent, or Firm* — Myers Bigel, P.A.

(57) ABSTRACT

According an aspect of the present invention there is provided a navigation system for a vehicle comprising: a communication module arranged to receive event information regarding a plurality of events, wherein the plurality of events are each associated with a location; a processor arranged to determine whether any of the plurality of events could affect a user of the navigation system; and an output arranged to inform the user of any determined events.

16 Claims, 10 Drawing Sheets

(58) Field of Classification Search
USPC .......................................................... 701/423
See application file for complete search history.

(56) References Cited

U.S. PATENT DOCUMENTS

| | | | |
|---|---|---|---|
| 2005/0083211 A1* | 4/2005 | Shafir | G08G 1/0962 340/905 |
| 2005/0209770 A1 | 9/2005 | O'Neill et al. | |
| 2005/0267681 A1 | 12/2005 | Yato | |
| 2010/0057342 A1 | 3/2010 | Muramatsu | |
| 2011/0208646 A1* | 8/2011 | McMaster | G06Q 20/10 705/39 |
| 2013/0205026 A1 | 8/2013 | Ricci | |
| 2014/0244110 A1* | 8/2014 | Tharaldson | G07C 5/008 701/36 |

FOREIGN PATENT DOCUMENTS

| | | |
|---|---|---|
| WO | WO 2012/024722 | 3/2012 |
| WO | WO 2012/085925 | 6/2012 |

OTHER PUBLICATIONS

Comblned Search and Examination Report, GB Application No. 1406302.9, dated Sep. 29, 2014, 6 pages.
Notification of Transmittal of the International Search Report and the Written Opinion of the International Searching Authority, or the Declaration, PCT/EP2015/056353, dated Jun. 16, 2015, 11 pages.
Examination Report corresponding to GB Application No. 1405302.9 (4 pages) (dated Dec. 27, 2017).
Re-examination report—standard patent, AU Application No. 2015238429, dated Jun. 14, 2018, 12 pp.

* cited by examiner

NAVIGATION SYSTEM AND METHOD

RELATED APPLICATIONS

This application is a 35 U.S.C. § 371 national stage application of PCT Application No. PCT/EP2015/056353, filed on Mar. 25, 2015, which claims priority from Great Britain Patent Application No. 1405302.9 filed on Mar. 25, 2014, the contents of which are incorporated herein by reference in their entireties. The above-referenced PCT International Application was published in the English language as International Publication No. WO 2015/144746 A1 on Oct. 1, 2015.

TECHNICAL FIELD

The present disclosure relates to a navigation system and method and particularly, but not exclusively, to a navigation system and method suitable for vehicles travelling on un-surfaced roads or tracks. Aspects of the invention relate to a system, to a method and to a vehicle.

BACKGROUND

Drivers of vehicles may wish to drive off-road, in other words, on un-surfaced roads or tracks. Typically, these un-surfaced roads or tracks do not have road signs to give instructions or provide information to drivers.

Vehicles intended for off-road use often comprise satellite navigation systems to assist drivers in following roads and tracks to reach their desired destination. Typically, these satellite navigation systems determine a suitable route for the driver of the vehicle to follow.

Typically, the usability of remote off-road tracks varies with time. The condition of a track may vary, unbeknownst to a driver, potentially making a track impassable. This can happen, for example, due to adverse weather conditions or over-use of a track.

Further, the driver may not be aware of the boundaries between public and private land as these may not be fenced or signposted.

The above-mentioned problems may further extend to the road network. Additionally, the usability of roads in the road network may vary due to road maintenance, i.e. roadworks.

The present invention has been devised to mitigate or overcome at least some of the above-mentioned problems.

SUMMARY OF THE INVENTION

According to a first aspect of the present invention there is provided a navigation system for a vehicle comprising: a communication module arranged to receive event information relating to a plurality of events each associated with a location; a processor arranged to determine whether any of the plurality of events could affect a user of the navigation system; and an output arranged to inform the user of any determined events.

An event may comprise one or more of: an obstacle, a security risk, a restricted area or a regulation. Other events may also be relevant.

Advantageously, the processor may be arranged to query a plurality of databases in order: a restricted areas database, an obstacles database, a regulations database and a security risks database. The plurality of databases may be local or remote.

Additionally, the processor may be arranged to rank the severity of any determined events. Further, the processor may be arranged to rank the severity of any determined events in dependence on a vehicle capability. For example, the vehicle capability may comprise limited-slip differential, four wheel drive, snow tyres, high ground clearance, a snorkel or a skid plate.

The processor may be arranged to rank the severity of any determined events in accordance with a predetermined skill level of a driver. Ranking may comprise assigning a level to each determined event, and the level may comprise one or more of: colour coding, a numerical grading or letter grading.

Additionally, the output may comprise a command signal to a display to show icons along a route, and may be arranged to update the icons if the event severity changes.

The navigation system may further comprise a location detection module arranged to determine a first location of the navigation system, wherein the processor determines any events that could affect the user within a predetermined range of the navigation system.

Additionally, the navigation system may comprise a route predicting module arranged to determine a predicted route between the first location of the navigation system and an expected destination desired by the user, and wherein the processor determines any events that could affect the user within a predetermined range of the predicted route.

Advantageously, this would enable the navigation system to predict a route desired by the user.

Additionally, the navigation system may comprise a route determining module arranged to receive a desired destination of the user and to calculate a desired route between a second location and the desired destination, and wherein the processor determines any events that could affect the user within a predetermined range of the desired route. Advantageously, this would enable the navigation system to determine an optimum route to a destination desired by the user.

Additionally, the navigation system may comprise a data storage module arranged to store the received event information, and wherein the event information is periodically received from the communication module and stored in the data storage module.

The event information may comprise one or more of a date, a time, a description, a repeat incidence, an impact level and a temporal dimension associated with the event. Additionally, the event information may be updated by a person with local knowledge, i.e. comprehensive knowledge of a particular geographic area. Additionally or alternatively, the event information may be updated by a person with Internet access. Additionally or alternatively, the event information is updated by an automated search program.

Additionally, the output may comprise audio broadcast for audibly informing the user of any determined events, and may comprise a command signal to a display for visually informing the user of any determined events.

The communication module may be arranged to receive updates to the event information from a user. Additionally, the processor may be arranged to run a validation process in order to validate that the user has permission to upload updates to event information. Further, the validation process may comprise at least one of: a username/password, facial recognition, voice recognition, a personal identification number and the communication module checking with a remote server. The output may then be arranged to supply the updated event information to a remote server.

The processor of the navigation system may be arranged to automatically create and/or update event information.

The invention extends to a mobile device comprising the navigation system of the first aspect of the present invention.

The invention extends to a vehicle comprising the navigation system of the first aspect of the present invention.

According to another aspect of the present invention there is provided a database comprising: an input module to receive event information regarding a plurality of events; a data store for storing the event information; an output module to supply the event information to the navigation system according to the first aspect of the invention.

According to another aspect of the present invention there is provided a method of identifying relevant events for use in a vehicle navigation system comprising: receiving event information regarding a plurality of events, wherein the plurality of events are each associated with a location; determining whether any of the plurality of events could affect a user of the vehicle navigation system; and informing the user of any determined events.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner

BRIEF DESCRIPTION OF THE DRAWINGS

One or more embodiments of the invention will now be described, by way of example only, with reference to the accompanying drawings, in which.

DETAILED DESCRIPTION

Embodiments of the present invention provide a system and method for providing drivers with navigational assistance and timely event information. Whilst embodiments described below are discussed in relation to off-roading, it is to be understood that the systems and processes described could equally be used in the context of a road network.

Figure 1:
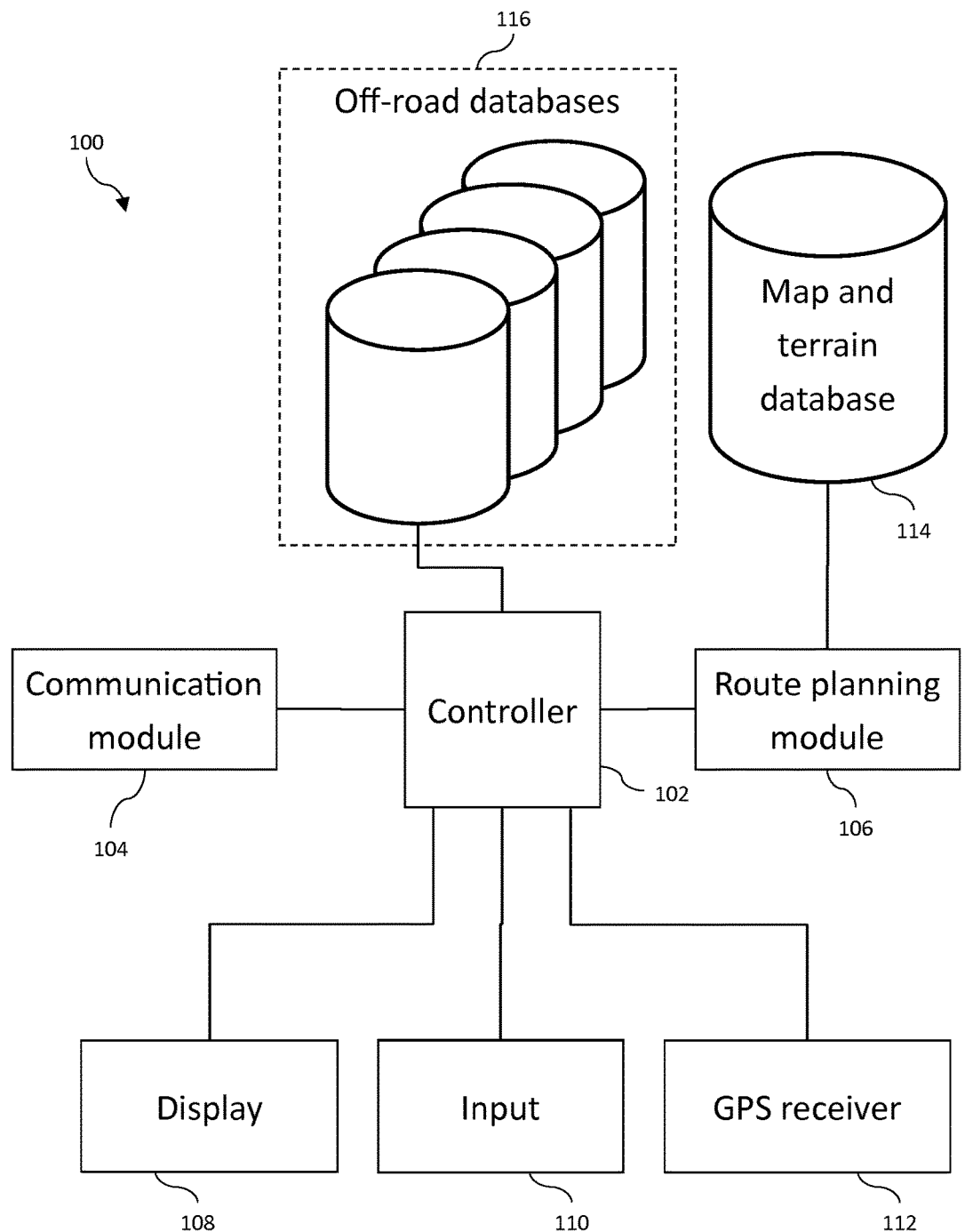
FIG. 1 is a schematic block diagram showing a navigation system according to an embodiment of the invention.

FIG. 1 shows a navigation system 100 suitable for vehicles, in particular vehicles travelling on un-surfaced roads or tracks. The navigation system 100 comprises a controller 102, a communication module 104, a route planning module 106, a display 108, an input 110, a Global Positioning System (GPS) receiver 112, a map and terrain database 114 and a plurality of off-road databases 116. The communication module 104, the route planning module 106, the display 108, the input 110, the GPS receiver 112 and the plurality of off-road databases 116 are each operatively connected to the controller 102.

The communication module 104 is configured to communicate data to and from the Internet wirelessly, for example using Wi-Fi, Bluetooth, GPRS, 3G or LTE protocols as are known in the art.

The map and terrain database 114 comprises map data with known roads and tracks, the elevation and slope of the land, and overhead images (e.g. satellite or aerial photographs).

The route planning module 106 is connected to the map and terrain database 114 and is configured to determine a route from a first location (typically the current location of the vehicle) to a second location along pre-existing roads and tracks. The route determined between the first location and the second location by the route planning module 106 may be optimised for shortest distance, shortest time and/or difficulty of the route. Alternatively, the user may manually define the route using the maps and terrain database 114.

The display 108 and the input 110 enable the user to interact with the navigation system 100. The input 110 may comprise a plurality of buttons, a keyboard or a microphone configured to receive voice commands. The display 108 provides visual feedback to the user. In other embodiments, the input 110 is integral to the display 108, for example, in a touchscreen monitor.

The GPS receiver 112 is configured to receive signals from a plurality of GPS satellites in order to determine the location of the navigation system 100 (and hence the location of the vehicle in which the navigation system is installed) on the surface of the Earth. In other embodiments, the location of the vehicle is determined using other means, such as cellular tracking or other space-based satellite navigation systems (e.g. GLONASS, Galileo, Beidou).

Figure 2:
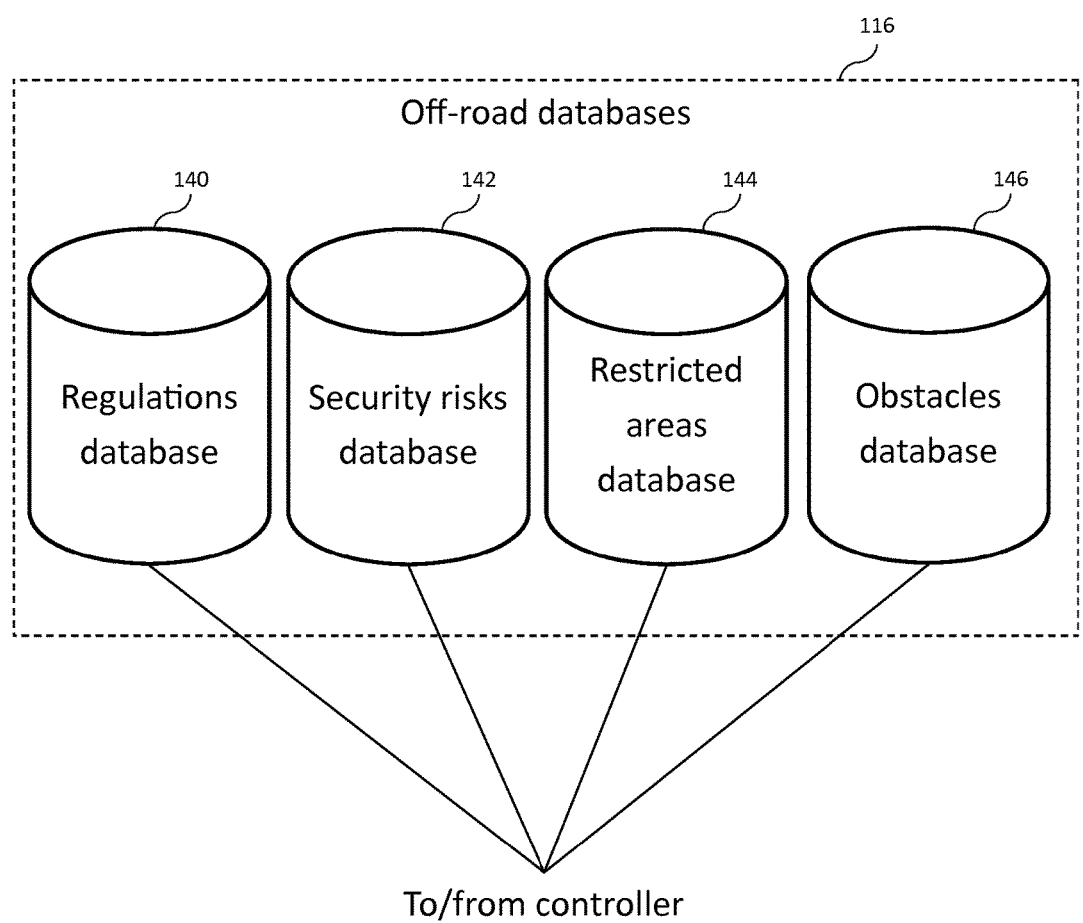
FIG. 2 is a schematic block diagram showing the off-road databases of the navigation system illustrated in FIG. 1.

FIG. 2 shows the plurality of off-road databases 116. Specifically, the plurality of off-road databases 116 comprises a regulations database 140, a security risks database 142, a restricted areas database 144 and an obstacles database 146. Each database 140, 142, 144, 146 is connected to the controller 102.

The off-road databases 116 store information about events that may affect the vehicle and/or its occupants whilst driving off-road. The information about the events includes one or more of the nature of the event, the location of the event and the impact level of the event (i.e. the potential effect of the event). If there is an obstacle blocking a track, the obstacles database comprises information detailing that the obstacle is, for example, a fallen tree, the location of the fallen tree and that the fallen tree makes the track completely impassable to vehicles that don't have a chainsaw on board.

Each of the off-road databases 116 has a corresponding master database. The master databases are located in a data centre that is connected to the Internet. The information in the off-road databases 116 are periodically synchronised with their corresponding master databases. The way in which information is updated in the master databases is discussed in more detail later.

Figure 3:
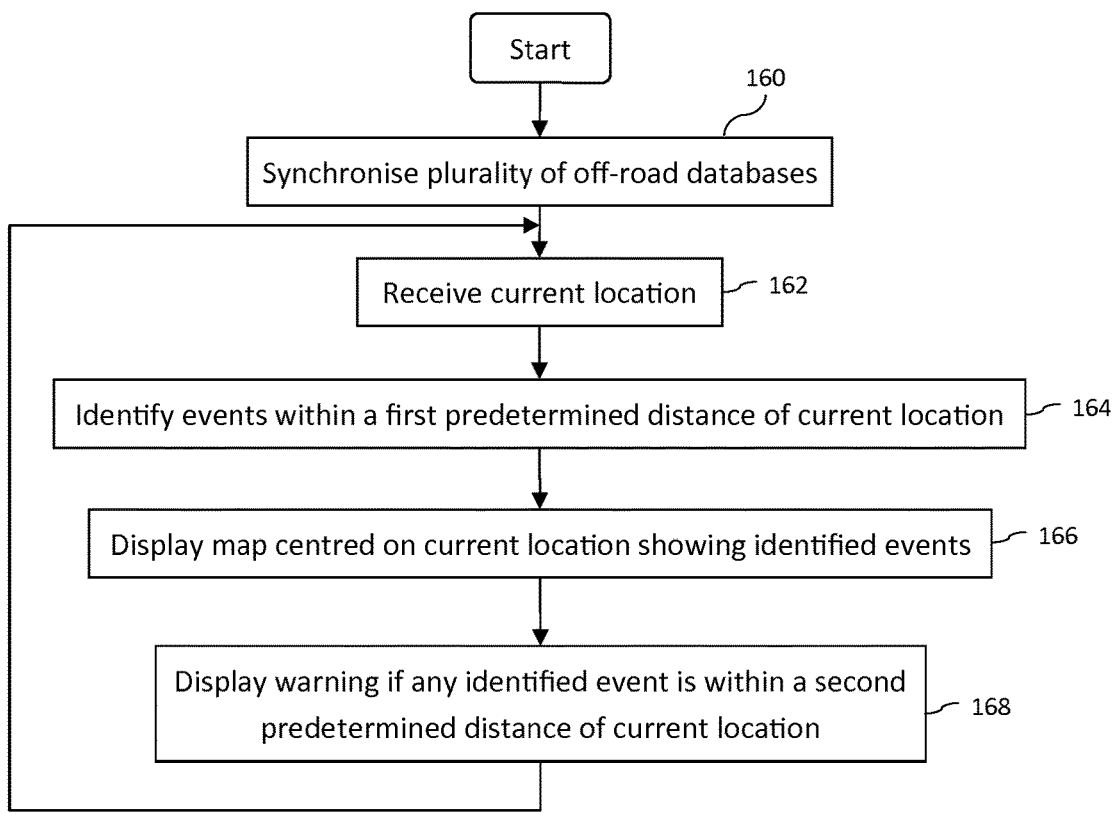
FIG. 3 is a flowchart of a process carried out by the navigation system of FIG. 1.

FIG. 3 shows a process carried out by the navigation system when the user does not wish to define a specific route.

The process starts with the controller synchronising at Step 160 the off-road databases 116 with the master databases via the communication module 104. Following this, the controller 102 receives at Step 162 the current location of the vehicle from the GPS receiver 112.

Then the controller 102 queries the off-road databases 116 to identify at Step 164 any events within a first predetermined distance of current location route. The controller 102 queries the off-road databases 116 in the following order: first the restricted areas database 144, second the obstacles database 146, third the regulations database 140 and fourth the security risks database 142. A map is displayed at Step 166 on the display 108, centred on the current location and showing the location and details of any events identified in Step 164. Accordingly, the first predetermined distance may be relative to the size of the display 108 and the zoom level of the map being displayed such that the off-road databases 116 are queried to show events that would appear on the display 108.

Any events identified are colour-coded on the display 108 to represent the impact level of the event. For example, an event with a low impact level is coloured green, medium impact level is coloured orange, high impact level is coloured red and informational impact level is coloured blue.

If any identified event is within a second predetermined distance of current location of the vehicle, wherein the first predetermined distance is larger than the second predetermined distance, a warning is prominently displayed at Step 168 to the user.

As the vehicle moves, the process then loops back to receiving at Step 162 the current location of the vehicle. This allows the navigation system 100 to continue to display event details relevant to the current locations of the vehicle. In other embodiments, the process loops back to synchronising at Step 160 the off-road databases 116.

Figure 4:
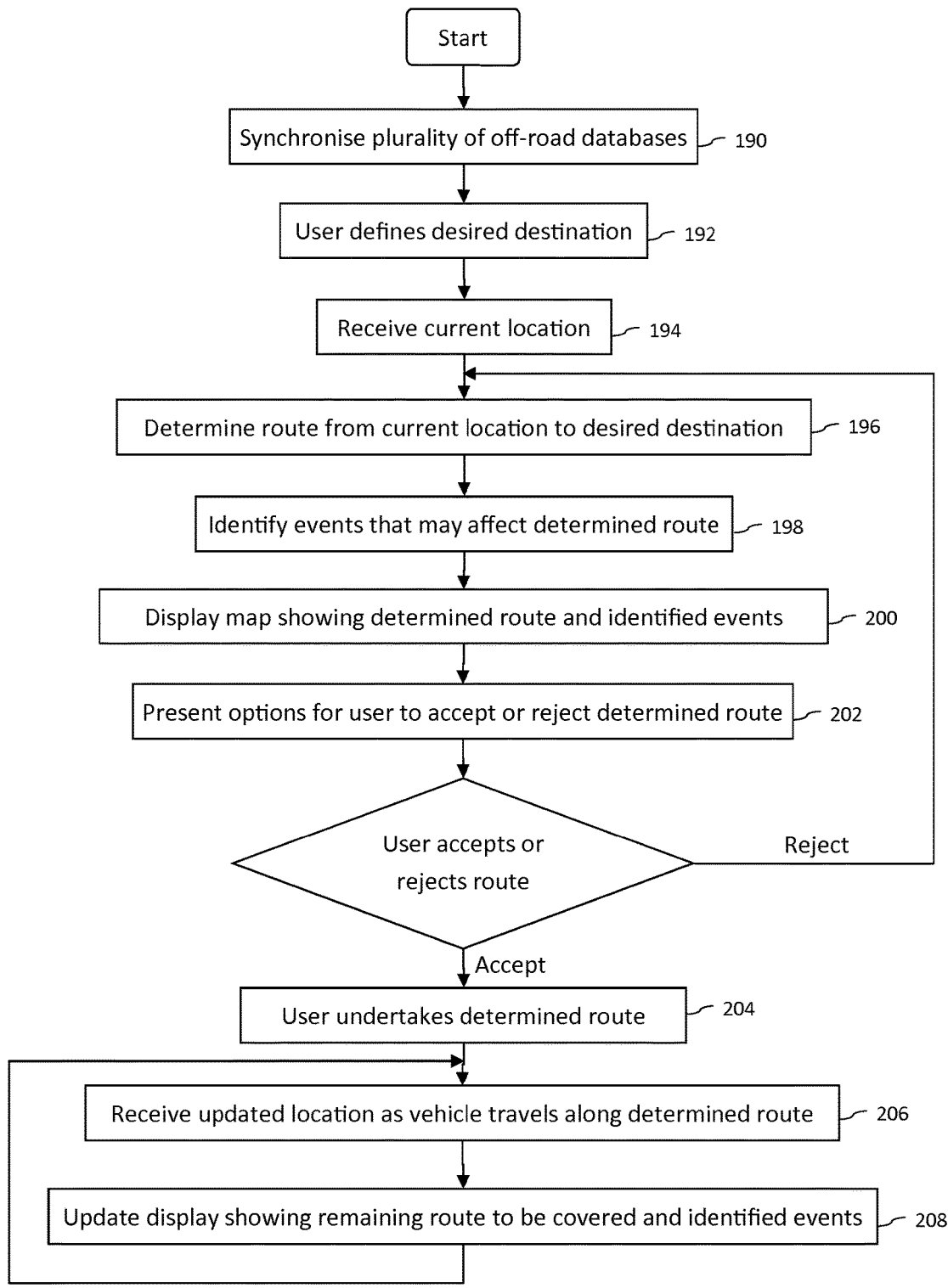
FIG. 4 is a flowchart of a process carried out by the navigation system of FIG. 1.

FIG. 4 shows a process carried out by the navigation when the user provides a desired destination.

The process starts with the controller synchronising at Step 190 the off-road databases 116 with the master databases via the communication module 104. Then the user defines at Step 192 their desired destination. Following this, the controller 102 receives at Step 194 the current location of the vehicle from the GPS receiver 112.

In other embodiments, the route planning module 106 predicts a route from one or more routes previously undertaken by the user, without the user defining at Step 192 the desired destination. The process would then continue as below.

The route planning module 106 then determines at Step 196 a route between the current location and the desired destination specified by the user. Then the controller 102 queries the off-road databases 116 to identify at Step 198 any events that may affect the determined route. The controller 102 queries the off-road databases 116 in the following order: first the restricted areas database 144, second the obstacles database 146, third the regulations database 140 and fourth the security risks database 142. A map is displayed at Step 200 on the display 108, showing the determined route and details of any events identified at Step 198.

The display 108 presents at Step 202 options for the user to accept or reject the determined route shown on the display 108. In other embodiments, a difficulty rating is also displayed at Step 202, wherein the difficulty rating is determined from the most severe impact level of the events identified.

The user may choose not to undertake the determined route as the user may not wish to risk encountering any of the identified events. For example the event may be a flood, in which case if the vehicle did not comprise sufficient ground clearance or a snorkel, it would not be able to pass the event. Alternatively, the driver of the vehicle may decide that they are not sufficiently skilled in off-road driving to overcome an identified event.

If the user elects to reject the route, the process returns to determine at Step 196 an alternative route between the current location and the desired destination. On the other hand, if the user accepts the determined route, the process continues and the user begins to undertake at Step 204 the determined route.

As the user travels along the determined route, the controller 102 receives at Step 206 the updated location of the vehicle from the GPS receiver 112. Accordingly, the display 108 is updated at Step 208 showing the remaining route to be covered and any identified events along the route. As the user approaches any identified events, a warning is prominently displayed to the user.

The process loops back to receiving at Step 206 the updated location of the vehicle until the vehicle arrives at the desired destination. Alternatively, the user may choose to discontinue following the route before reaching the desired destination. If the driver of the vehicle does not correctly follow the route, the process returns to determining at Step 196 a route from current location to desired destination.

Figure 5:
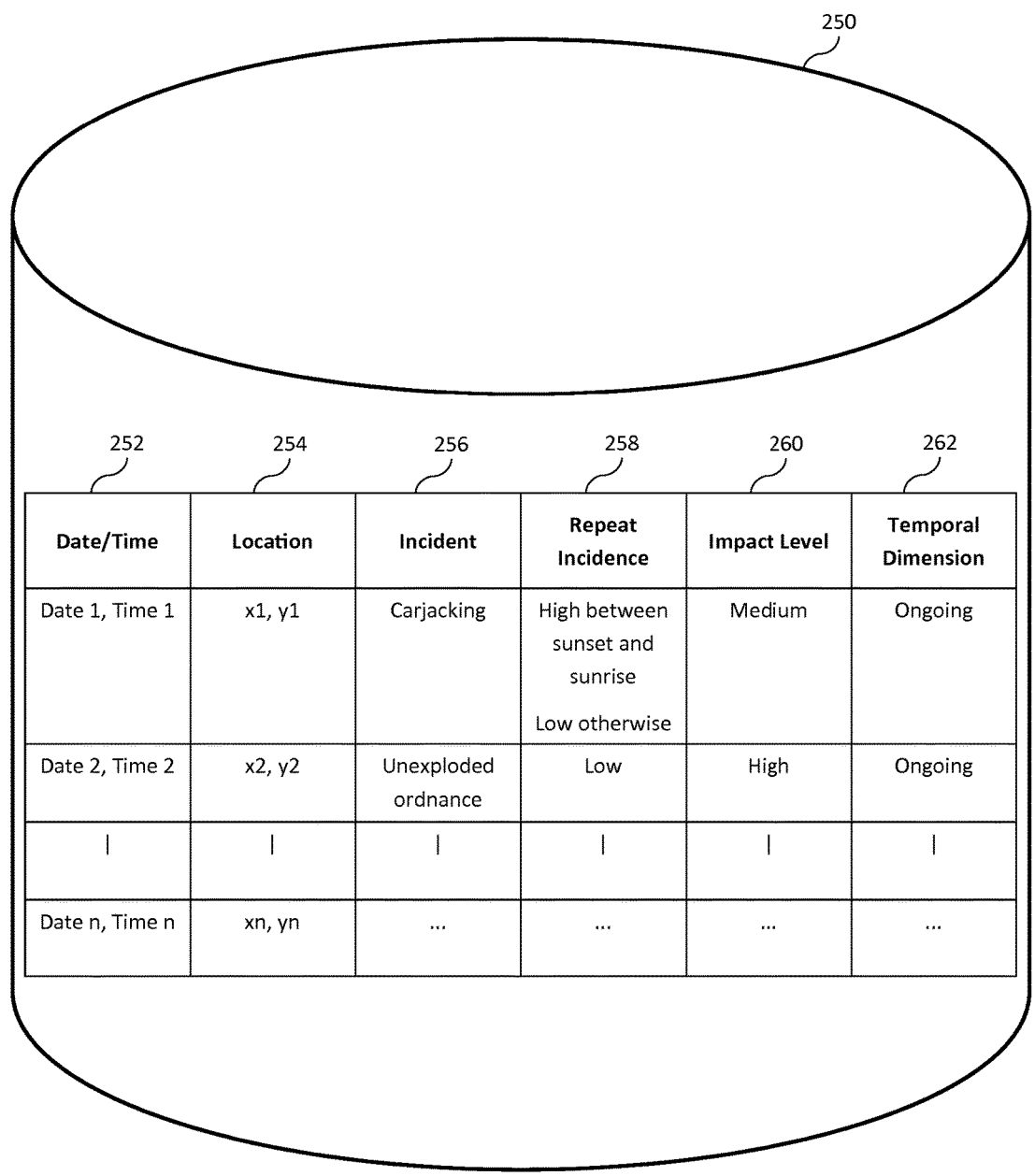
FIG. 5 is a schematic diagram of a master security risks database.

FIG. 5 shows the master security risks database 250. The master security risks database 250 is populated with information related to the events that may affect the safety of the vehicle and its occupants. Non-limiting examples of events in the security risks database include carjacking, hijacking, unexploded ordnance and minefields.

For each event, the master security database 250 comprises a date and time 252 the event first occurred, one or more geographic locations 254 of the event (for example in the form of coordinates, latitude and longitude, ordnance survey grid reference etc.), a description of the event 256, a repeat incidence 258, an impact level 260 and a temporal dimension 262.

If the event relates to a specific place, one geographic location 254 is used. If the event relates to a geographic region, a plurality of geographic locations 254 are the vertices of a border that defines of the geographic region.

The repeat incidence 258 is the likelihood of the event occurring and may vary for a given event depending on factors such as the time of day.

The impact level 260 for a given event may vary depending on the capabilities and equipment of the vehicle, such as limited-slip differential, four wheel drive, snow tyres, high ground clearance, a snorkel or a skid plate. For example, the impact level 260 of a flood would be lower for a vehicle equipped with a snorkel compared to a vehicle without. The impact level 260 may be given on a number scale from 1 to 5 wherein 1 is the lowest impact level and 5 is the highest impact level, or the impact level may be defined in terms of low, medium, high and informational impact levels.

The temporal dimension 262 indicates how long the event is expected to continue for. For example, this information may be provided as an end date, a period of duration or defined as indefinite (in other words, an on-going event duration).

Figure 6:
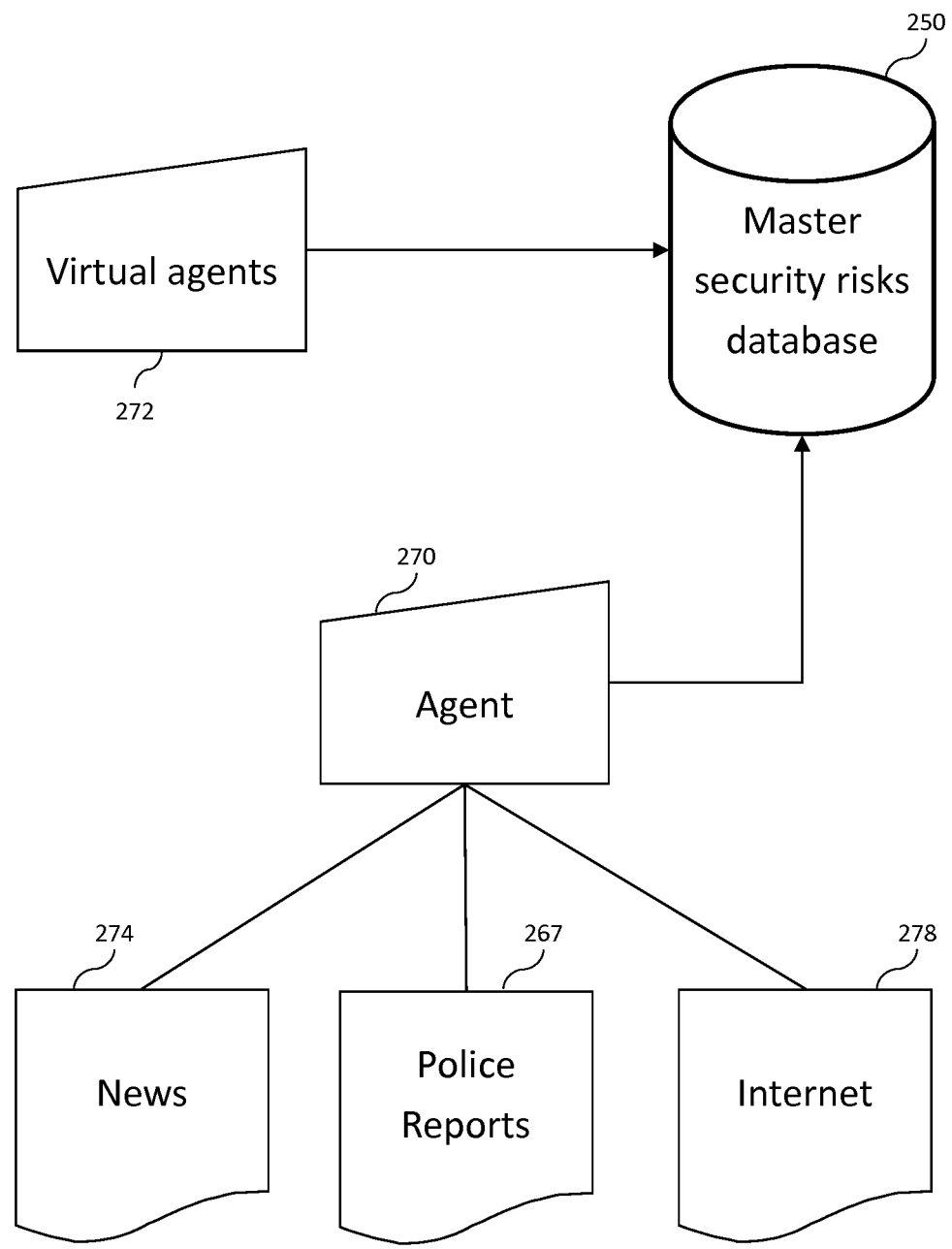
FIG. 6 is a schematic block diagram showing data sources for the master security risks database of FIG. 5.

FIG. 6 shows the data input to the master security risks database 250. The events in the master security risks database 250 are created and updated by an agent 270 and a plurality of virtual agents 272. Both the agent 270 and virtual agents 272 access the master security risks database 250 through a user interface.

The virtual agents 272 are personnel who each have a comprehensive knowledge of a particular geographic area (i.e. the virtual agents 272 have "local knowledge") and use this to keep the details of events in that geographic area up-to-date in the master security risks database 250.

The agent 270 uses resources including the news 274, police reports 276 and Internet web sites 278 to obtain information about events to keep the details of events up-to-date in the master security risks database 250. The agent 270 populates the master security risks database 250 regarding events in any geographic area. The agent 270 may be a person (but without "local knowledge") or an automated search program such as a web crawler).

Figure 7:
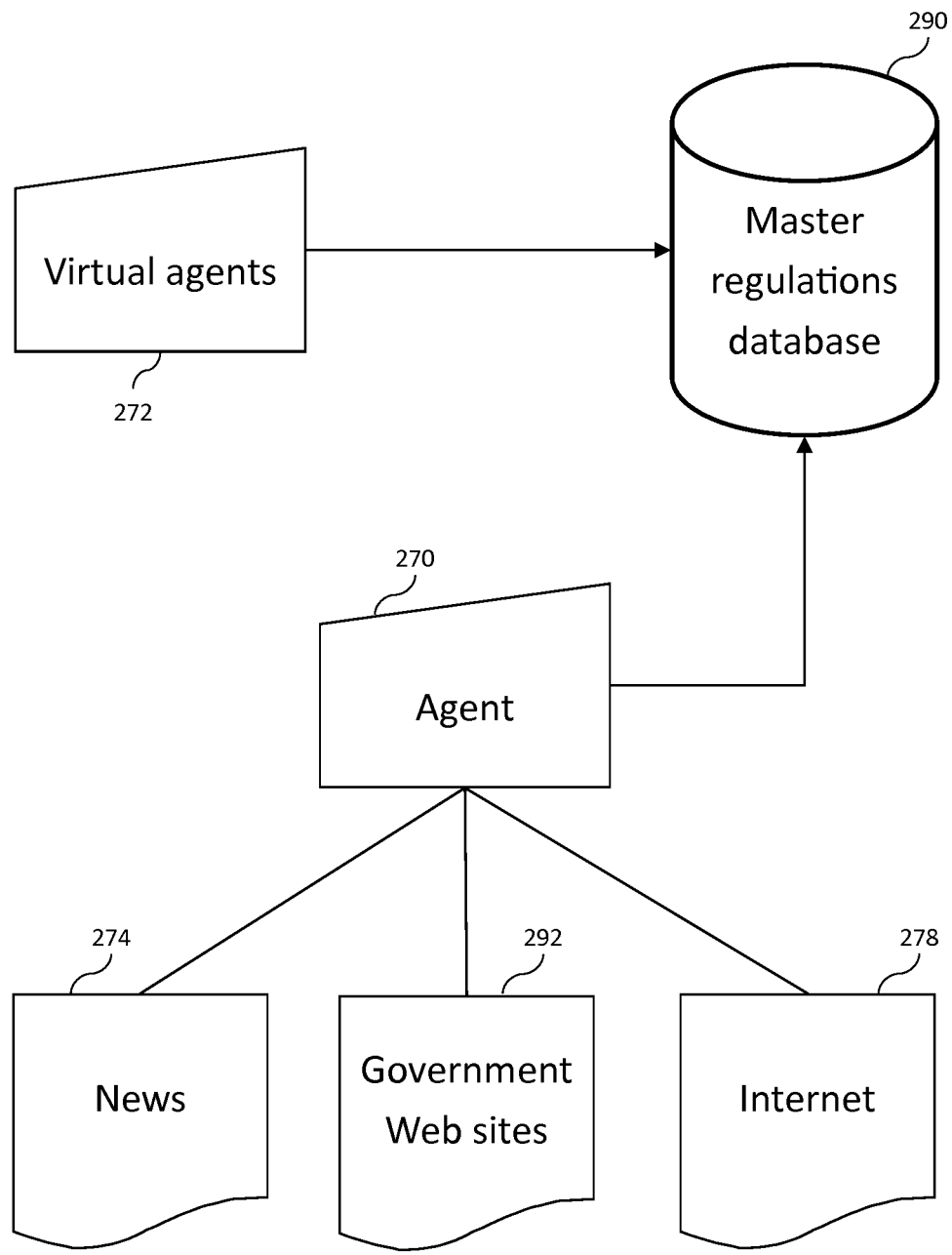
FIG. 7 is a schematic block diagram showing data sources for a master regulations database of FIG. 2.

FIG. 7 shows the data input to the master regulations database 290. The master regulations database 290 comprises details of events regarding the latest regulations that apply to driving in certain geographic regions. For each event, the master regulations database 290 comprises a date and time the event first occurred, one or more geographic locations of the event, a description of the event, an impact level and a temporal dimension. Regulations that apply to driving may restrict all or certain specified types of vehicles, and may apply to certain times or certain seasons. Typically, regulations that apply to driving off-road are intended to preserve and protect the local environment and wildlife.

Similarly to the data input to the master security risks database 250 in FIG. 6, the events in the master regulations database 290 are created and updated by an agent 270 and a plurality of virtual agents 272. Both the agent 270 and virtual agents 272 access the master regulations database 290 through a user interface.

The virtual agents 272 are personnel who each have a comprehensive knowledge of a particular geographic area and use this to keep the details of events in that geographic area up-to-date in the master regulations database 290.

The agent 270 uses resources including the news 274, government web sites 292 and other Internet web sites 278 to obtain information about events to keep the details of events up-to-date in the master regulations database 290. The agent 270 populates the master regulations database 290 regarding events in any geographic area.

Figure 8:
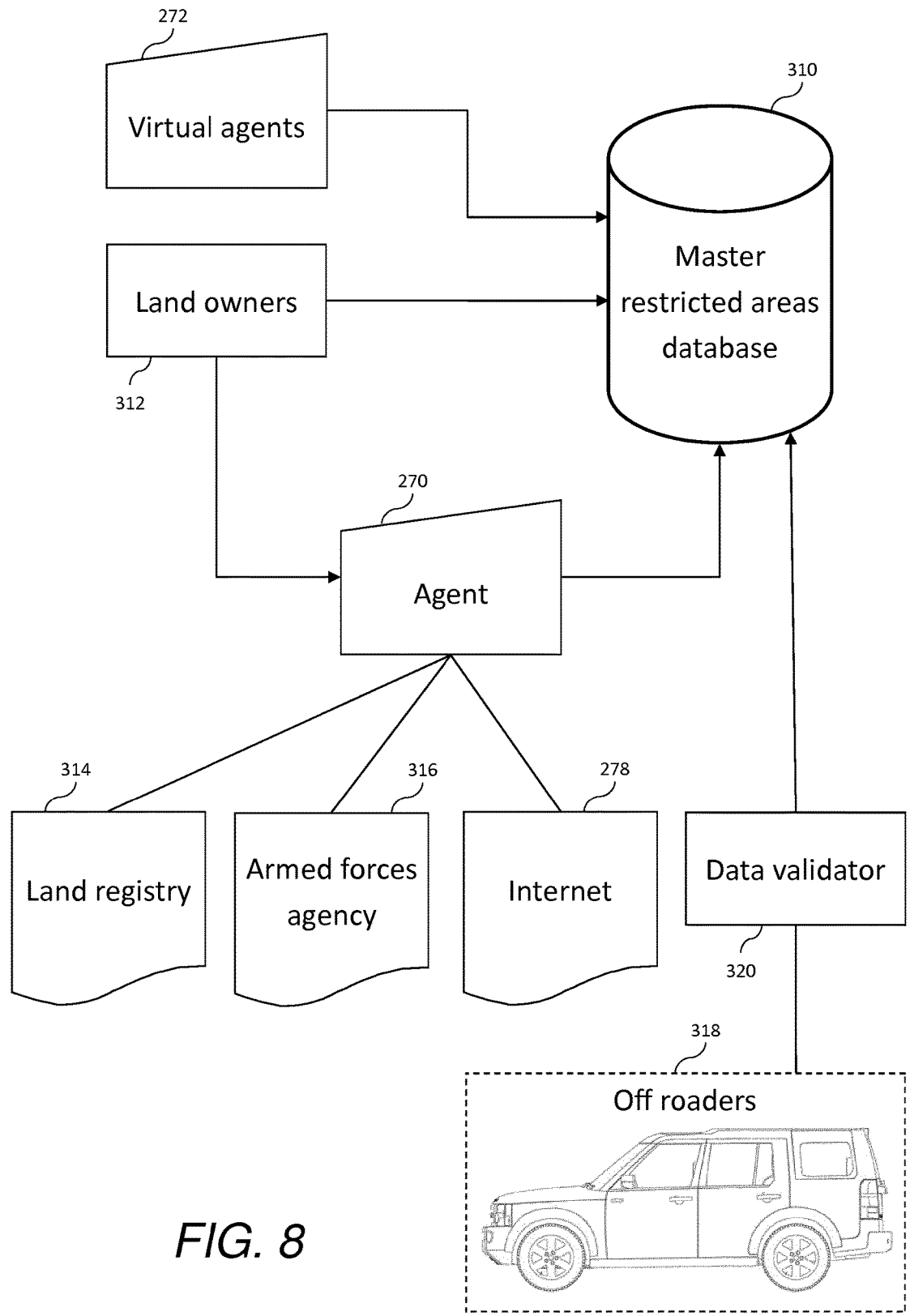
FIG. 8 is a schematic block diagram showing data sources for a master restricted areas database of FIG. 2.

FIG. 8 shows the data input to the master restricted areas database 310. The master restricted areas database 310 comprises details of events including private property, firing ranges and military areas.

Similarly to the data input to the master security risks database 250 in FIG. 6, the events in the master restricted areas database 310 are created and updated by an agent 270 and a plurality of virtual agents 272. Both the agent 270 and virtual agents 272 access the master regulations database 310 through a user interface. Additionally, land owners 312 may access and update the master restricted areas database either directly or via the agent 270 to provide updates on land they control.

The virtual agents 272 are personnel who each have a comprehensive knowledge of a particular geographic area and use this to keep the details of events in that geographic area up-to-date in the master restricted areas database 310.

The agent 270 uses resources including the land registry 314, armed forces agencies 316 (e.g. the Ministry of Defence in the UK, or the Department of Defense in the US) and other Internet web sites 278 to obtain information about events to keep the details of events up-to-date in the master restricted areas database 310. The agent 270 populates the master restricted areas database 310 regarding events in any geographic area.

Further, off-road users 318 can supply information regarding events that they encounter. This information is validated by a data validator 320, for example by confirmation by a second source, before the event is updated in the master restricted areas database 310. The input 110 of the navigation system 100 can be used to enter details of an event the user has encountered, wherein the GPS receiver 112 provides the geographic location of the event. In this way, the off-road users have "local knowledge" as they directly encounter the event.

Figure 9:
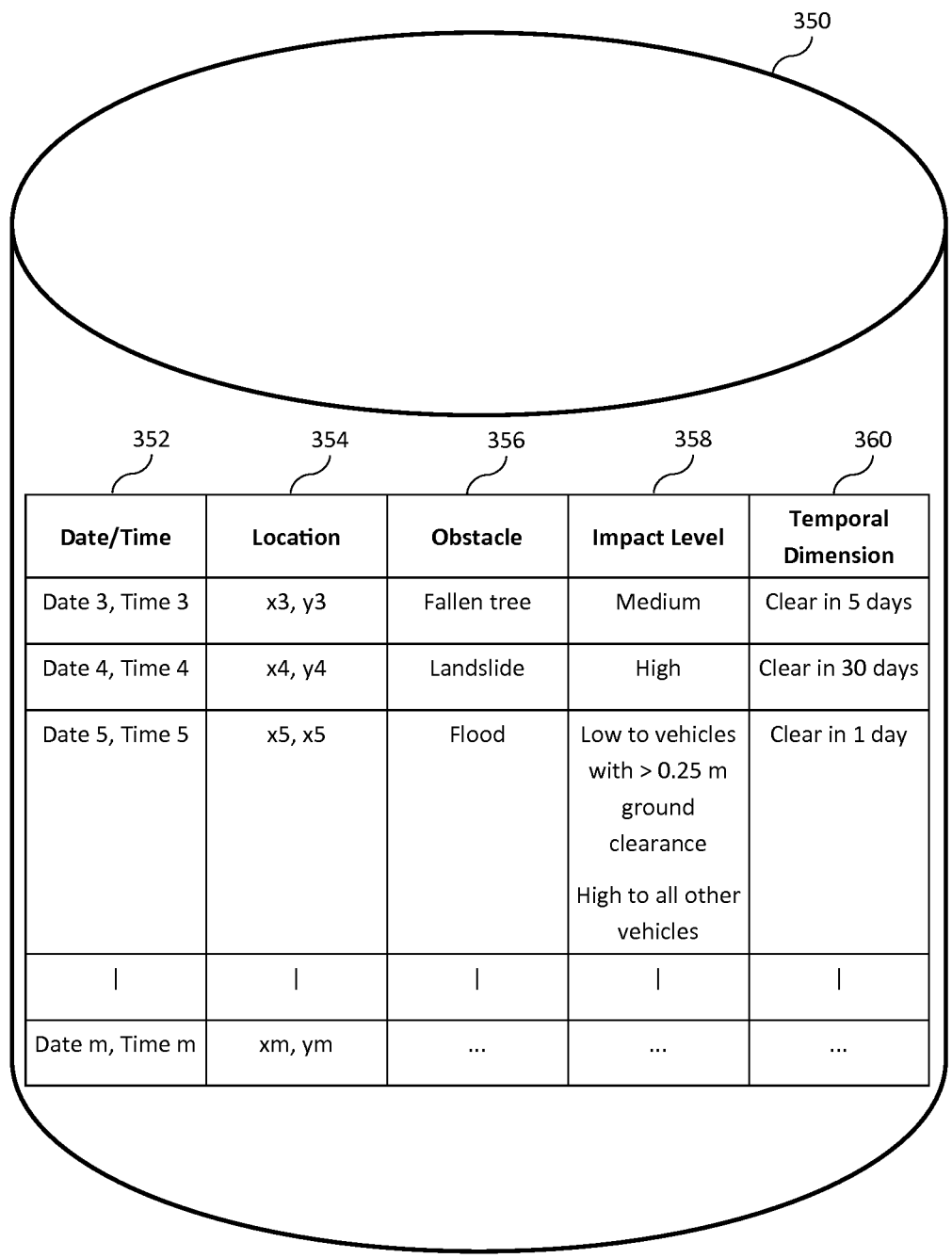
FIG. 9 is a schematic diagram of a master obstacles database.

FIG. 9 shows the master obstacle database 350 in greater detail. The master obstacle database 350 is populated with information related to the events that may prevent or hinder the progress of a vehicle. Non-limiting examples of events in the obstacle database 350 include fords, sinkholes, floods, fallen trees, landslides, deteriorated tracks and rockfalls.

For each event, the master obstacle database 350 comprises a date and time 352 the event first occurred, one or more geographic locations 354 of the event (for example in the form of coordinates, latitude and longitude, ordnance survey grid reference etc.), a description of the event 356, an impact level 358 and a temporal dimension 360.

Figure 10:
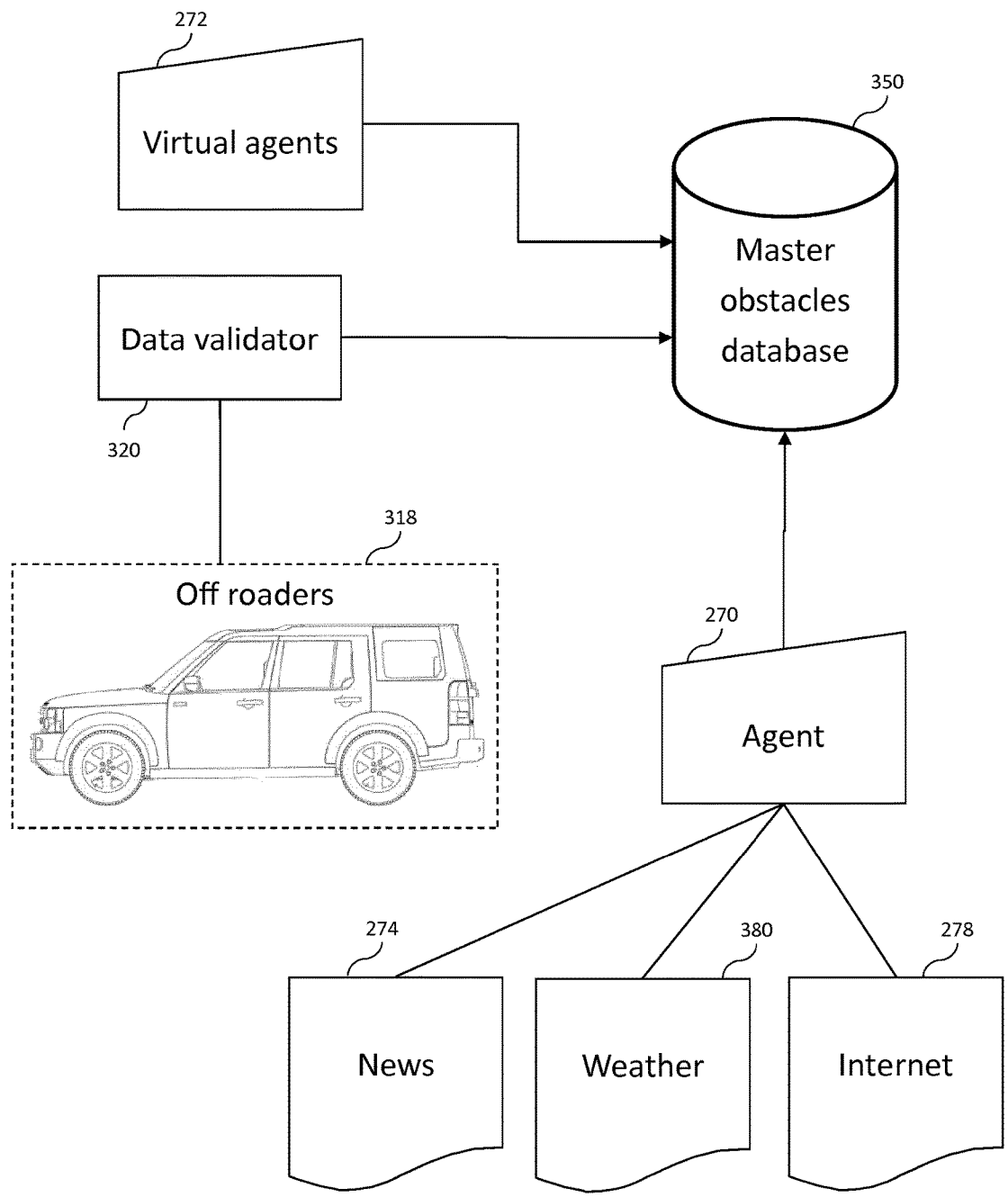
FIG. 10 is a schematic block diagram showing data sources for the obstacles database of FIG. 9.

FIG. 10 shows the data input to the master obstacle database 350.

Similarly to the data input to the master security risks database 250 in FIG. 6, the events in the master obstacle database 350 are created and updated by an agent 270 and a plurality of virtual agents 272. Both the agent 270 and virtual agents 272 access the master obstacle database 350 through a user interface. Additionally, off-road users 318 can supply information regarding events that they encounter. This information is validated by a data validator 320, for example by confirmation by a second source, before it is included in the master obstacle database 350.

The virtual agents 272 are personnel who each have a comprehensive knowledge of a particular geographic area and use this to keep the details of events in that geographic area up-to-date in the master obstacle database 350.

The agent 270 uses resources including the news 274, the weather forecast 380 and alerts and other Internet web sites 278 to obtain information about events to keep the details of events up-to-date in the master obstacle database 350. The agent 270 populates the master obstacle database 350 regarding events in any geographic area.

Many modifications may be made to the above examples without departing from the scope of the present invention as defined in the accompanying claims.

For example, the navigation system 100 does not comprise mirrored copies of the off-road databases 116. In this case, synchronising (at Step 160 of FIG. 3 and Step 190 of FIG. 4) the off-road databases 116 does not occur. Instead, when the events are identified (at Step 164 of FIG. 3 and Step 198 of FIG. 4), a request is sent via the communication module 104 to query the master databases directly.

The navigation system 100 may comprise a speaker configured to provide audible feedback to the user regarding events. For example, a warning sound could be emitted by the speaker if the vehicle came within a predetermined distance of an event, or the event details could be played to the user.

In another example, the navigation system 100 may comprise a plurality of accelerometers arranged in an inertial navigation system. The inertial navigation system augments the location data from the GPS receiver to refine the location data.

Further aspects of the present invention are set out in the following numbered paragraphs:

1. A navigation system for a vehicle comprising:
   a communication module arranged to receive event information regarding a plurality of events, wherein the plurality of events are each associated with a location;
   a processor arranged to determine whether any of the plurality of events could affect a user of the navigation system; and
   an output arranged to inform the user of any determined events.

2. The navigation system of paragraph 1, wherein an event comprises one or more of: an obstacle, a security risk, a restricted area or a regulation.

3. The navigation system of paragraph 1, wherein the processor is arranged to query a plurality of databases in order: a restricted areas database, an obstacles database, a regulations database and a security risks database.

4. The navigation system of any preceding paragraph, wherein the processor is arranged to rank the severity of any determined events.

5. The navigation system of paragraph 4, wherein the processor is arranged to rank the severity of any determined events in dependence on a vehicle capability.

6. The navigation system of paragraph 4, wherein the processor is arranged to rank the severity of any determined events in accordance with a predetermined skill level of a driver.

7. The navigation system of paragraph 4, wherein ranking comprises assigning a level to each determined event.

8. The navigation system of paragraph 7, wherein the level comprises one or more of:
   colour coding, a numerical grading or letter grading.

9. The navigation system of paragraph 4, wherein the output comprises a command signal to a display to show icons along a route.

10. The navigation system of paragraph 9, wherein the output is arranged to update the icons if the event severity changes.

11. The navigation system of paragraph 1, further comprising a location detection module arranged to determine a first location of the navigation system, and wherein the processor determines any events that could affect the user within a predetermined range of the navigation system.

12. The navigation system of paragraph 1, further comprising a route predicting module arranged to determine a predicted route between the first location of the navigation system and an expected destination desired by the user, and wherein the processor determines any events that could affect the user within a predetermined range of the predicted route.

13. The navigation system of paragraph 11, further comprising a route determining module arranged to receive a desired destination of the user and to calculate a desired route between a second location and the desired destination, and wherein the processor determines any events that could affect the user within a predetermined range of the desired route.

14. The navigation system of paragraph 1, further comprising a data storage module arranged to store the received event information, and wherein the event information is periodically received from the communication module and stored in the data storage module.

15. The navigation system of paragraph 1, wherein the event information comprises one or more of a date, a time, a description, a repeat incidence, an impact level and a temporal dimension associated with the event.

16. The navigation system of paragraph 1, wherein the event information is updated by a person with local knowledge.

17. The navigation system of paragraph 1, wherein the event information is updated by a person with Internet access.

18. The navigation system of paragraph 1, wherein the event information is updated by an automated search program.

19. The navigation system of paragraph 1, wherein the output comprises audio broadcast for audibly informing the user of any determined events.

20. The navigation system of paragraph 1, wherein the output comprises a command signal to a display for visually informing the user of any determined events.

21. The navigation system of paragraph 1, wherein the communication module is arranged to receive updates to the event information from a user.

22. The navigation system of paragraph 21, wherein the processor is arranged to run a validation process in order to validate that the user has permission to upload updates to event information.

23. The navigation system of paragraph 22, wherein the validation process comprises at least one of: a username/password, facial recognition, voice recognition, a personal identification number and the communication module checking with a remote server.

24. The navigation system of paragraph 21, wherein the output is arranged to supply the updated event information to a remote server.

25. The navigation system of paragraph 1, wherein the processor is arranged to automatically create and/or update event information.

26. A mobile device comprising the navigation system of paragraph 1.

27. A vehicle comprising the navigation system of paragraph 1.

28. A database comprising:
   an input module to receive event information regarding a plurality of events;
   a data store for storing the event information;
   an output module to supply the event information to the navigation system according to any of paragraphs 1 to 25.

29. A method of identifying relevant events for use in a vehicle navigation system comprising:
   receiving event information regarding a plurality of events, wherein the plurality of events are each associated with a location;
   determining whether any of the plurality of events could affect a user of the vehicle navigation system; and
   informing the user of any determined events.

The invention claimed is:

1. An off-road navigation system for a vehicle, the off-road navigation system comprising:
   a communication module that receives event information relating to a plurality of events, wherein the plurality of events are obstacles, and wherein each obstacle is associated with a location;
   a processor that determines whether any of the plurality of events could affect a user of the off-road navigation system while driving off-road; and an output that comprises a command signal to a display, the output being configured to control the display to inform the user of any determined events that may affect a determined route;
wherein the processor is arranged to rank severity of any determined events in dependence on a vehicle capability indicative of an ability of the vehicle to pass the event, wherein the processor ranks by assigning a level to each determined event; and
wherein the output is configured to control the display to display a difficulty rating of the determined route, the difficulty rating being determined from a most severe level of the determined events.

2. The off-road navigation system of claim 1, wherein the processor queries a plurality of the following databases in order: a restricted areas database, an obstacles database, a regulations database and a security risks database.

3. The off-road navigation system of claim 1, wherein the processor ranks the severity of any determined events in accordance with a predetermined skill level of a driver.

4. The off-road navigation system of claim 1, wherein the level comprises one or more of: colour coding, a numerical grading or letter grading.

5. The off-road navigation system of claim 1, wherein the output is configured to control the display to show icons along the route, and wherein the output updates the icons if a severity of the event changes.

6. The off-road navigation system of claim 1, comprising at least one of the following:
a location detection module that determines a first location of the off-road navigation system, and wherein the processor determines events within a predetermined range of the off-road navigation system;
a route predicting module that determines a predicted route between the first location of the off-road navigation system and an expected destination desired by the user, and wherein the processor determines events within a predetermined range of the predicted route;
a route determining module that receives a desired destination of the user and calculates a desired route between a second location and the desired destination, and wherein the processor determines events within a predetermined range of the desired route; and
a data storage module that stores the received event information, and wherein the received event information is periodically received from the communication module and stored in the data storage module.

7. The off-road navigation system of claim 1, wherein the event information comprises one or more of a date, a time, a description, a repeat incidence, an impact level and a temporal dimension associated with a respective event.

8. The off-road navigation system of claim 1, wherein the event information is updated by at least one of the following: a person with local knowledge, a person with Internet access, and an automated search program.

9. The off-road navigation system of claim 1, wherein the output comprises audio broadcast for audibly informing the user of any determined events and/or a command signal to a display for visually informing the user of any determined events.

10. The off-road navigation system of claim 1, wherein the communication module receives updates to the event information from a user.

11. The off-road navigation system of claim 10, wherein the processor runs a validation process in order to validate that the user has permission to upload updates to the event information.

12. The off-road navigation system of claim 11, wherein the validation process comprises at least one of: a username/password, facial recognition, voice recognition, a personal identification number and the communication module checking with a remote server.

13. The off-road navigation system of claim 10, wherein the output provides the updates to the event information to a remote server.

14. The off-road navigation system of claim 1, wherein the processor automatically creates and/or updates the event information.

15. A vehicle comprising an off-road navigation system, the off-road navigation system comprising:
a communication module that receives event information relating to a plurality of events, wherein the plurality of events are obstacles, and wherein each obstacle is associated with a location;
a processor that determines whether any of the plurality of events could affect a user of the navigation system while driving off-road; and
an output that comprises a command signal to a display, the output configured to control the display to inform the user of any determined events that may affect a determined route;
wherein the processor is arranged to rank severity of any determined events in dependence on a vehicle capability indicative of an ability of the vehicle to pass the event, wherein the processor ranks the severity by assigning a level to each determined event, and wherein the output is configured to control the display to display a difficulty rating of the determined route, the difficulty rating being determined from a most severe level of the determined events.

16. A method of identifying relevant events for use in an off-road navigation system of a vehicle, the method comprising:
electronically receiving event information relating to a plurality of events, wherein the plurality of events are obstacles, and wherein each obstacle is associated with a location;
electronically determining whether any of the plurality of events could affect a user of the off-road navigation system while driving off-road;
electronically informing the user of any determined events that may affect a determined route;
electronically ranking severity of any determined events in dependence on a vehicle capability indicative of an ability of the vehicle to pass the event, wherein the ranking comprises assigning a level to each determined event; and
electronically informing the user of a difficulty rating of the determined route, wherein the difficulty rating is determined from a most severe level of the determined events.

* * * * *